Figure 1:
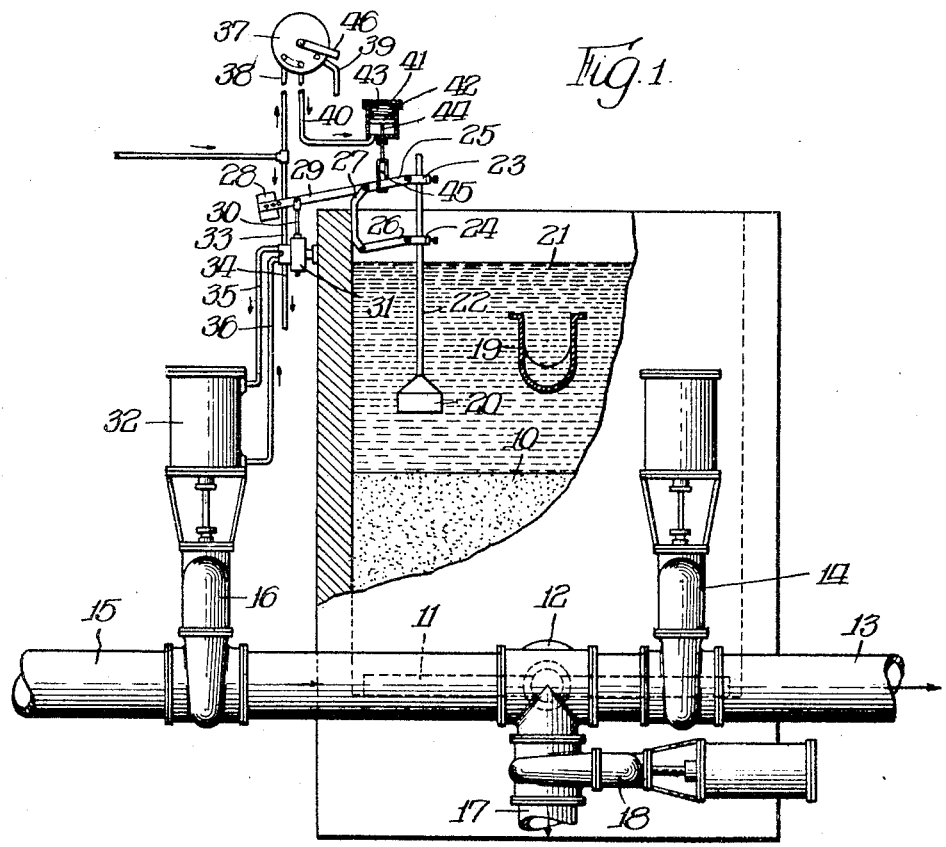

Jan. 3, 1933.  W. J. HUGHES  1,892,951
AUTOMATIC FILTER WASH CONTROL
Filed Aug. 29, 1931

Inventor:
Walter J. Hughes,
By Cromwell, Greist & Warden
attys.

Patented Jan. 3, 1933

1,892,951

UNITED STATES PATENT OFFICE

WALTER J. HUGHES, OF CHICAGO, ILLINOIS, ASSIGNOR TO GENERAL ZEOLITE CO., OF CHICAGO, ILLINOIS, A CORPORATION OF ILLINOIS

AUTOMATIC FILTER WASH CONTROL

Application filed August 29, 1931. Serial No. 560,198.

This invention has to do with sand filters of the open or gravity type, and is particularly concerned with the washing of such filters.

In washing filters of the type referred to, the present practice makes use of a rate of flow controller which is set to admit water to the filter under-drain or distributor at a substantially constant rate. This method involves the use of a wash water inlet valve and a rate of flow controller—the latter consisting usually of a Venturi tube, diaphragm chambers connected to the upstream and throat sections of the venturi, and a diaphragm-actuated main line valve.

In following the practice referred to, it has been found that a constant or fixed rate of filter washing is not always efficient in keeping the filter bed of sand or other granular material in proper condition. Wash rates which are too low result in improper cleansing of the filter material, necessitating prolonged washing and a waste of wash water. Wash rates which are too high, however, result in too great expansion of the filter material and loss of same from the filter.

Another factor which affects the proper washing of a given bed of filter material is the temperature and corresponding viscosity of the wash water. This factor is totally ignored in present practice, which deals entirely with a control which merely holds the wash water constant although there may be variation in the head under which the wash water is supplied. Other variables are left to the operator entirely.

Wash water at different temperatures requires application to the filter at rates which increase as the temperature of the water increases in order to secure the same amount of sand bed expansion. For example, filter sand of a given screen analysis will expand about 40% of its settled depth at a wash rate of about ten gallons per minute per unit square foot of filter area when the water is at about 35° F. temperature. When the wash water is at about 65° F. temperature, it is necessary, in order to get the same 40% expansion, that the wash rate be increased to about fifteen gallons per minute per square foot of filter bed area.

It will be understood, therefore, that in present practice, with a wash rate controller set for a given rate with water at 35° F., an increase in the water temperature with no increase in the rate of flow will result in a lesser sand expansion. This will result in less effective cleansing of the sand grains since with less expansion there is less movement of the particles while in a state of suspension. On the other hand, if the wash rate is set while the water temperature is about 65° F., a decrease in the temperature with no corresponding decrease in the rate of flow will result in an increased expansion, with the danger of washing the filter material out of the filter.

Without going into the details of measuring filter materials, required wash rates, etc., all of which is subject matter familiar to those skilled in the filtration art, it will be evident from the foregoing that improved results can be obtained by using the degree of expansion of a filter sand bed during washing as the factor in controlling the rate of flow for the wash water.

The present invention has for its object the provision of apparatus for automatically producing any desired percentage of filter bed expansion regardless of variations in the wash water supply head or pressure and regardless of any fluctuations in the wash water temperature.

Another object of the invention is to provide means to utilize the filter wash water inlet valve not only to start and stop the washing operation but also to control the wash water automatically in accordance with the sand expansion once the washing operation has been started.

Still another object of the invention is to provide means to start and stop the washing operation at a point remote from the wash water inlet valve, as for instance, at the operating panel or table of the filter unit.

While the foregoing statements are indicative in a general way of the nature of the invention, other objects and advantages will be apparent to those skilled in the art upon a full understanding of the construction, arrangement and operation of the novel control apparatus.

One form of the invention is presented herein for the purpose of exemplification, but it will of course be appreciated that the invention is susceptible of embodiment in other structurally modified forms coming equally within the scope of the appended claims.

Figure 2:
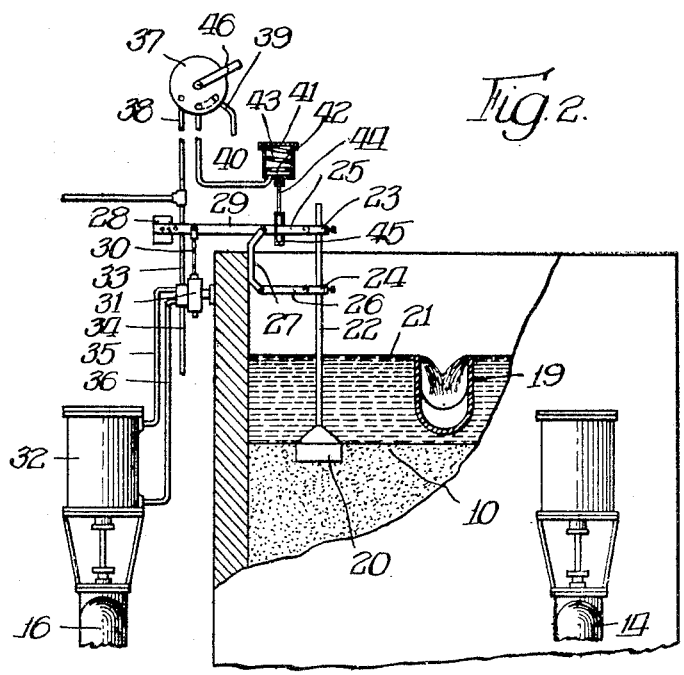

In the accompanying drawing:

Fig. 1 is a side view of an open gravity filter, with a portion of one wall broken away to show the interior of the filter and the sand float positioned therein; and Fig. 2 is a corresponding view which shows the sand in the filter expanded during the washing operation.

The particular filter used to illustrate one adaptation of the invention is of ordinary construction and contains a bed 10 of sand or other granular filtering material. The under-drain 11 in the bottom of the filter is connected by a fitting 12 to an effluent line 13 containing a valve 14, a wash water inlet line 15 containing a valve 16 and a waste line 17 containing a valve 18. A trough 19 is positioned in the upper portion of the filter, with the edge of the trough disposed a fixed distance above the surface of the bed 10, which distance is known as the free-board or expansion space. The unfiltered water inlet line (not shown) is connected with one end of the trough 19, and the wash water outlet line (not shown) is also connected with the trough. Both of such lines contain valves (not shown), which valves, together with the previously mentioned valves 14, 16 and 18, are employed in the usual way in effecting the filtering, washing and re-washing operations.

During the regular filtering operation, all of the valves are closed with the exception of the valve (not shown) in the unfiltered water inlet line and the valve 14 in the effluent line 13; during the washing operation, all of the valves are closed except the valve 16 in the wash water inlet line 15 and the valve (not shown) in the wash water outlet line; and, during the re-washing operation, all of the valves are closed except the valve (not shown) in the unfiltered water inlet line and the valve 18 in the waste line 17.

The automatic control which forms the subject matter of this invention includes a sand float 20 which is positioned in the filter below the level of the water 21 therein. The float 20 is in the form of an open-bottom conical-top bell and is mounted on the lower end of a tube 22, which tube forms a vent for the bell and prevents any air which might separate from the water from accumulating in the bell and giving it undesired buoyancy. The tube 21 is arranged in an upright position and is adjustably secured to two collars 23 and 24, which collars are pivotally connected to two parallel links 25 and 26 which are in turn pivotally connected to a bracket 27 on one of the side walls of the filter. The uppermost link 25 is extended beyond the bracket 27 and is provided with an adjustably positioned counterweight 28. As a result of this arrangement, the float 20 and the tube 22 are free to move up and down. The weight 28 is so positioned that, when the float 20 is submerged in the water, it will just overbalance the weight 28 and will sink into its lowermost position. The continuation 29 of the link 25 is connected by a rod 30 to a four-way pilot valve 31 of any suitable construction having two flow reversing positions and a neutral position, which pilot valve serves to automatically control the operation of a hydraulic cylinder 32 which is connected with the previously mentioned valve 16 in the wash water inlet line 15.

One of the ports of the pilot valve 31 is connected to a pressure water inlet line 33, another port is connected with a waste line 34, another is connected with a line 35 which leads to the top of the cylinder 32, and the remaining port is connected with a line 36 which leads to the bottom of the cylinder 32. Since pilot valve hook-ups of this type are well known in the art, no detailed description thereof is believed to be necessary.

The four ports of the pilot valve 31 are arranged in such a way that when the bell 20 is free in the water and sinks therein, the rod 30 lifts the valve 31 to connect the bottom cylinder line 36 with the pressure line 33 and the top cylinder line 35 with the waste line 34. When so connected, the valve 16 will open and admit wash water from a suitable source to the under-drain 11 in the bottom of the filter.

A three-way control valve 37 of any suitable construction is located at any convenient point, such as at the operating panel of the filter unit, and is connected with a pressure water inlet line 38, which may be a branch line from the line 33. The valve 37 is also connected with a waste line 39 and a line 40 which leads into the bottom of a small cylinder 41. The cylinder 41 contains a piston 42 which is pressed downwardly in the cylinder by a compressed spring 43. The piston 42 has a downwardly extending stem 44 which terminates in a vertically elongated loop 45. The link 25 extends through the loop 45 and is capable of a certain amount of free movement up and down therein. When the control valve 37 is moved by the operating handle 46 on the same into a position wherein the line 40 is placed in communication with the pressure line 38, the piston 42 will be raised against the action of the spring 41 and the loop 45 will act on the link 25 to lift the bell 20 into its uppermost position, in which position the pilot valve 31 will place the pressure line 33 in communication with the top cylinder line 35 and the bottom cylinder connection 36 in communication with the waste line 34 and cause the valve 16 to close.

In the position of the control valve 37 shown in Fig. 1, the loop 45 will hold the bell 20 in its uppermost position out of service. At the same time, the pilot valve 31 is held in a position to keep the wash water valve 16 tightly closed.

To start the washing operation, the operator closes all of the filter valves and opens the waste valve (not shown) which permits the water in the upper part of the filter to lower to the level of the trough 19. The operator then turns the control valve 37 to release the pressure in the cylinder 41. The spring 43 thereupon depresses the piston 42, lowering the loop 45 and freeing the link 25. The weight of the bell 20 overbalances the counterweight 28 as it sinks in the water, thus through rod 30 reversing the ports of the pilot valve 31 and causing the valve 16 in the waste water inlet line 15 to open.

In Fig. 2, the control apparatus is shown during the washing operation, with the sand bed 10 expanded by the wash water to a height corresponding to a bell position which brings the link 25 and pilot valve 31 to its neutral position. If a decrease in the wash water head should cause a decrease in the rate of flow of the wash water, the sand expansion will decrease. When this happens, the bell 20 will lower, thus changing the position of the pilot valve 31 and resulting in a further opening of the valve 16. An increase in the wash rate due to an increase in the pressure on the wash water will cause a slight closing of the valve 16. From this it will be understood that the rate of flow of the wash water will be controlled by the position of the bell 20. The same control will be effected in case there is an increase or decrease in the viscosity of the water due to changes in temperature, which changes may or may not accompany the changes in pressure.

With the type of pilot valve shown, the size of the bell 20 will be ample if made about ten inches in diameter and five inches in straight side wall height. The bell 20 should have the conical top in order to prevent any sand from lodging on top of the same. When the bell 20 is immersed in water, the weight of the water in the cylinder part of the bell will be about 14 pounds. If the position of the bell 20 is set neutral by the link 25 when the top edge of the cylindrical portion of the bell is fifty percent of the sand bed depth above its top surface, then, during washing, a rate of flow will be permitted which gives a fifty percent expansion.

Unexpanded sand weighs about 100 pounds per cubic foot and possesses about one-third voids, which voids, filled with water, weigh about 21 pounds. The weight of the unexpanded mixture is thus 121 pounds per cubic foot. When expanded fifty percent, a cubic foot of sand weighs 66⅔ pounds. The water contained in the voids in the expanded sand will weigh about 35 pounds. Thus the expanded mixture will weigh about 102 pounds per cubic foot. The amount of this mixture displaced by the bell 20 will weigh about 23 pounds. Thus there is an available force to raise the bell 20 amounting to the difference in weight of the mixture displaced over the weight of the water entrapped in the bell— which difference will be about 9 pounds. This force will be found ample to operate the pilot valve 31.

I claim:

1. The combination with a filter, an expansible filter bed, and a wash water valve, of means for opening and closing said valve, and means responsive to the expansion of the bed for controlling the size of the opening through the valve.

2. In an automatic filter washing system, a sand float which is sensitive to the difference between the weight of the water contained and the weight of a mixture of sand and water displaced, a hydraulically operated gate valve in the wash water line of the system, a pilot valve for operating the gate valve, and a connection between the pilot valve and the float.

3. In an automatic filter washing system, a sand float which is sensitive to the difference between the weight of the water contained and the weight of a mixture of sand and water displaced, a hydraulically operated gate valve in the wash water line of the system, a pilot valve for operating the gate valve, a connection between the pilot valve and the float, and manually operated means for moving the float into a position wherein the pilot valve will close the gate valve.

4. In an automatic filter washing system, a sand float which is sensitive to the difference between the weight of the water contained and the weight of a mixture of sand and water displaced, a hydraulically operated gate valve in the wash water line of the system, a pilot valve for operating the gate valve, a connection between the pilot valve and the float, and means for rendering the float inoperative with respect to the pilot valve.

5. In an automatic filter washing system, a sand float which is sensitive to the difference between the weight of the water contained and the weight of a mixture of sand and water displaced, a hydraulically operated gate valve in the wash water line of the system, a pilot valve for operating the gate valve, a connection between the pilot valve and the float, and remote control means for lifting the float to cause the pilot valve to close the gate valve.

6. A filter, comprising a container, an unconfined bed of an expansible filtering material in said container, means for causing an upward flow of wash water to pass through said container and said material, and means responsive to the expansion of said filtering material for regulating said flow.

7. A filter, comprising a container, an unconfined bed of a filtering material in said container, means for creating an upward flow of water through said container, the volume of said material being increased with an increase in said upward flow, and automatic means responsive to changes in volume of said material for regulating said upward flow, whereby the degree of expansion of said bed is maintained substantially constant during said upflow.

8. The combination with a filter having an expansible filter bed, of means for washing the bed comprising a conduit for wash water, a valve on said conduit, and a float in said filter adapted to rise and fall in accordance with the expansion of said bed during the washing cycle, said float being operatively connected to said valve.

9. A filter having an expansible filter bed, a supply of wash water therefor, a valve for governing the flow of wash water through said bed, a member movable according to the expansion of said bed, and a connection between said member and said valve whereby the positioning of said valve may be governed by said member.

10. The method of washing a filter having an expansible filter bed, which comprises causing an outward flow of water to pass through said filter bed, thereby causing said filter bed to expand in accordance with the rate of said flow, and controlling the rate of flow by the expansion of said bed.

In testimony whereof I have hereunto subscribed my name.

WALTER J. HUGHES.